United States Patent
Maurer

(10) Patent No.: US 9,410,617 B2
(45) Date of Patent: Aug. 9, 2016

(54) METHOD FOR DETECTION AND ENABLING OF AN EVASIVE MANOEUVER IN A VEHICLE WITH AN AUTOMATED MANUAL TRANSMISSION

(71) Applicant: ZF Friedrichshafen AG, Friedrichshafen (DE)

(72) Inventor: Witali Maurer, Baunatal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 13/948,284

(22) Filed: Jul. 23, 2013

(65) Prior Publication Data

US 2014/0052352 A1 Feb. 20, 2014

(30) Foreign Application Priority Data

Aug. 14, 2012 (DE) .......................... 10 2012 214 497

(51) Int. Cl.
*F16H 61/16* (2006.01)
*F16H 61/688* (2006.01)
(Continued)

(52) U.S. Cl.
CPC ................ *F16H 59/48* (2013.01); *F16H 61/16* (2013.01); *F16H 61/688* (2013.01); *B60Y 2300/18041* (2013.01); *F16H 59/58* (2013.01); *F16H 2061/165* (2013.01); *F16H 2312/09* (2013.01)

(58) Field of Classification Search
CPC ....... F16H 61/16; F16H 61/688; F16H 59/42; F16H 2059/006; F16H 2059/405; F16H 2059/743; F16H 2061/0234; F16H 59/48; F16H 2061/165; F16H 2312/09; G01S 13/931; B60W 10/02

USPC ........................ 701/41, 51–52, 58, 48; 74/335
See application file for complete search history.

(56) References Cited

U.S. PATENT DOCUMENTS 5,875,680 A * 3/1999 Lorriette ......................... 74/335
6,074,020 A 6/2000 Takahashi et al.
(Continued)

FOREIGN PATENT DOCUMENTS

DE 196 51 760 A1 6/1997
DE 198 13 019 A1 9/1999
(Continued)

OTHER PUBLICATIONS

German Office Action Corresponding to 10 2012 214 497.8 mailed May 7, 2013.

*Primary Examiner* — Nga X Nguyen
(74) *Attorney, Agent, or Firm* — David & Bujold PLLC; Michael J. Bujold

(57) ABSTRACT

A method of detecting and enabling an evasive maneuver in a vehicle with an automated transmission, in which initially the method checks whether the reverse (R) drive is engaged, and checks whether the steering-wheel angle and the steering-wheel angular velocity are valid and in excess of threshold values. If so, a first timer is started and then the method checks to see if the yaw rate and the transverse acceleration of the vehicle exceed threshold values while the first timer is running, and when the yaw rate and the transverse acceleration of the vehicle exceed threshold values while the first timer is running, a driver's wish to carry out an escape turn is recognized and a second timer is started, and both timers have not yet run their course, the speed threshold for permitting engagement of the forward drive (D) is increased to exceed the normal threshold value for permitting engagement of forward drive (D) is a is a set is positioned.

6 Claims, 2 Drawing Sheets

(51) Int. Cl.
*F16H 59/48* (2006.01)
*F16H 59/58* (2006.01)

(56) References Cited

U.S. PATENT DOCUMENTS

| | | |
|---|---|---|
| 6,360,157 B1 | 3/2002 | Hartmann |
| 9,053,253 B2 * | 6/2015 | Felth et al. |
| 2008/0221760 A1 * | 9/2008 | Wakamatsu et al. ............ 701/52 |
| 2010/0241314 A1 * | 9/2010 | Bohm et al. ................... 701/41 |
| 2011/0313665 A1 * | 12/2011 | Lueke et al. .................. 701/301 |

FOREIGN PATENT DOCUMENTS

| | | |
|---|---|---|
| DE | 199 64 032 A1 | 7/2001 |
| DE | 101 30 659 A1 | 1/2003 |
| DE | 101 54 028 A1 | 4/2003 |
| DE | 102 22 173 A1 | 11/2003 |
| WO | 2011/151240 A1 | 12/2011 |

* cited by examiner

METHOD FOR DETECTION AND ENABLING OF AN EVASIVE MANOEUVER IN A VEHICLE WITH AN AUTOMATED MANUAL TRANSMISSION

This application claims priority from German patent application serial no. 10 2012 214 497.8 filed Aug. 14, 2012.

FIELD OF THE INVENTION

The present invention concerns a method for detecting and enabling of an evasive manoeuver in a vehicle with an automated transmission. In particular, the invention relates to a method for detecting and enabling of an evasive manoeuver in a vehicle with a dual-clutch transmission.

BACKGROUND OF THE INVENTION

In essence, a dual-clutch transmission comprises two strands or partial transmissions with various gearwheel pairs, two power-shifting clutches each of which is associated with a respective partial transmission, a drive input shaft and a drive output shaft, and interlocking, unsynchronized shifting clutches in accordance with the number of gears. In such a transmission the gears are arranged in alternation in the two partial transmissions, making it possible to preselect a gear in the load-free partial transmission while the drive torque is being transmitted by the other partial transmission.

A gearshift is carried out when the torque to be transmitted is transferred from one power-shifting clutch to the other so that the gears can be shifted while free from load, without traction force interruption and without stressing the shiftable gears. As a rule the odd-numbered gears can be shifted in one partial transmission and the even-numbered ones and the reversing gear in the other partial transmission.

From the prior art it is known, with vehicles having an automated transmission, to store speed threshold values in the electronic transmission control unit, such that a drive mode change from D to R or from R to D, which occurs for example during a parking or an un-parking process, can only take place if the speed of the vehicle is below the speed threshold concerned. This is intended to avoid mechanically damaging the transmission.

If a change of direction through 180° while driving rapidly in reverse is desired, i.e. a so-termed evasive manoeuver, it is thus disadvantageously not possible to engage the drive mode D. This can result in critical situations if it is necessary to carry out an evasive manoeuver for safety reasons.

SUMMARY OF THE INVENTION

The purpose of the present invention is to indicate a method whose implementation ensures that an evasive manoeuver is recognized and enabled in a vehicle with an automated transmission.

According to these, a method is proposed for detecting and enabling an evasive manoeuver in a vehicle with an automated transmission, in the process of which it is checked whether, when the R drive mode is engaged and valid sensor values are given for the steering-wheel angle and the steering-wheel angular velocity, predetermined threshold values for the steering-wheel angle and the steering-wheel angular velocity are being exceeded, and if the steering-wheel angle and the steering-wheel angular velocity are in excess of the predetermined threshold values, a first timer is started, and a driver's wish to carry out an evasive manoeuver is recognized if, with valid sensor values for the yaw rate and the transverse acceleration, the yaw rate and the transverse acceleration of the vehicle each exceed a respective predetermined threshold value while the first timer is running.

When a driver's wish to carry out an evasive manoeuver has been recognized, a second timer is started and the speed threshold for permissible engagement of the D drive mode is increased to a predefined threshold value which is higher than the normal threshold value for the permissible engagement of the D drive mode. According to the invention the new, higher value of the speed threshold for permissible engagement of drive mode D remains in force so long as the first and second timers have not yet run their course.

By virtue of the concept according to the invention, a driver's wish to carry out an evasive manoeuver is reliably recognized; in addition an evasive manoeuver can be carried out within a predefined time window.

In the case that a sensor value is transmitted by way of a data bus, for example a CAN-bus, the sensor value is recognized as valid as long as the status of the bus signal is in order. When a sensor value is read directly, the sensor value is recognized as valid if the sensor is operating normally and if it delivers a plausible signal.

The method according to the invention can be implemented, for example, in a vehicle with an automated transmission and an automated dual clutch.

BRIEF DESCRIPTION OF THE DRAWINGS

Below, the invention is explained in more detail with reference to the drawings which show

DETAILED DESCRIPTION OF THE PREFERRED EMBODIMENTS

Figure 1:
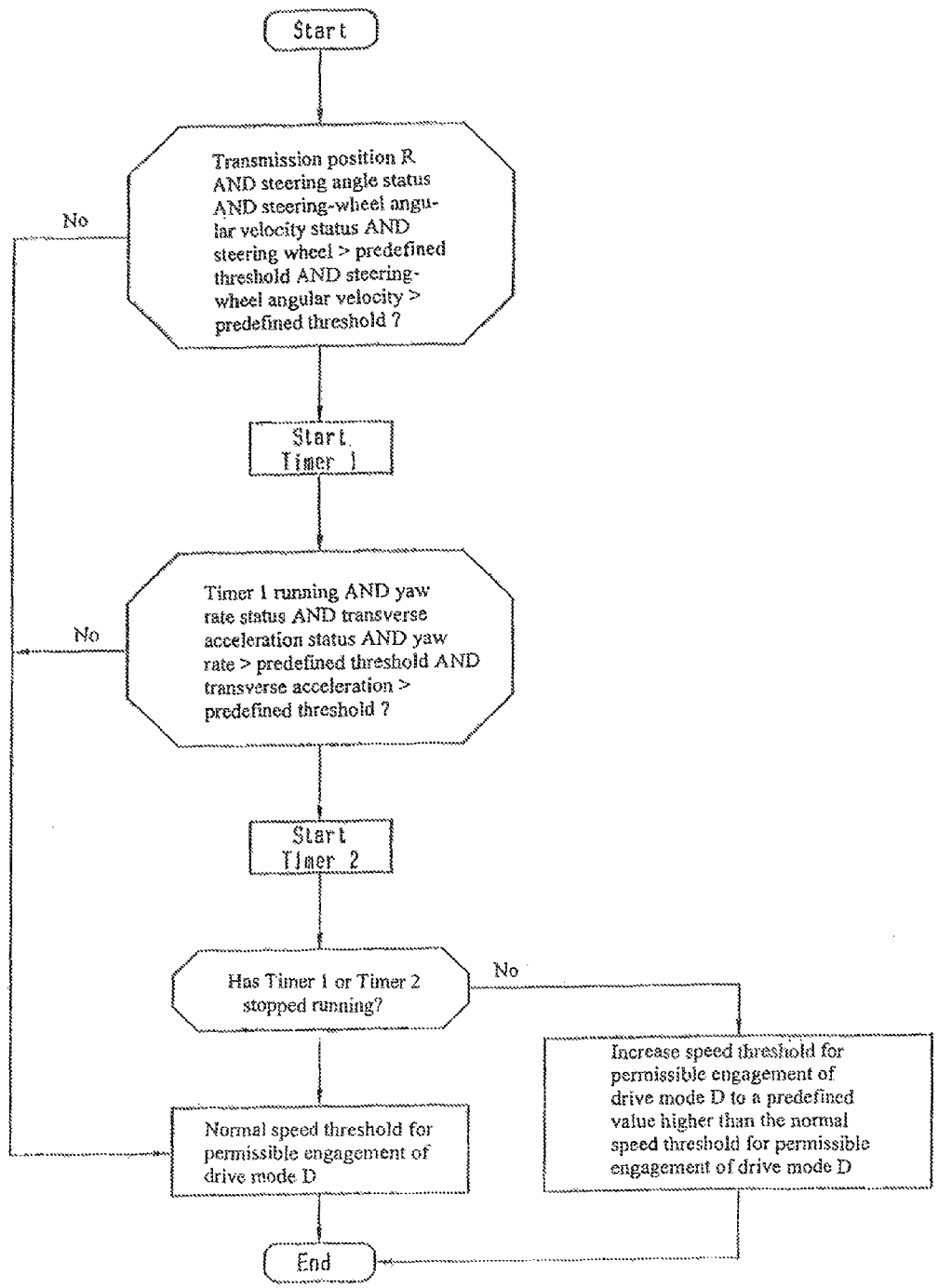
FIG. 1 is a flow diagram which illustrates an example of the method according to the invention.
Figure 2:
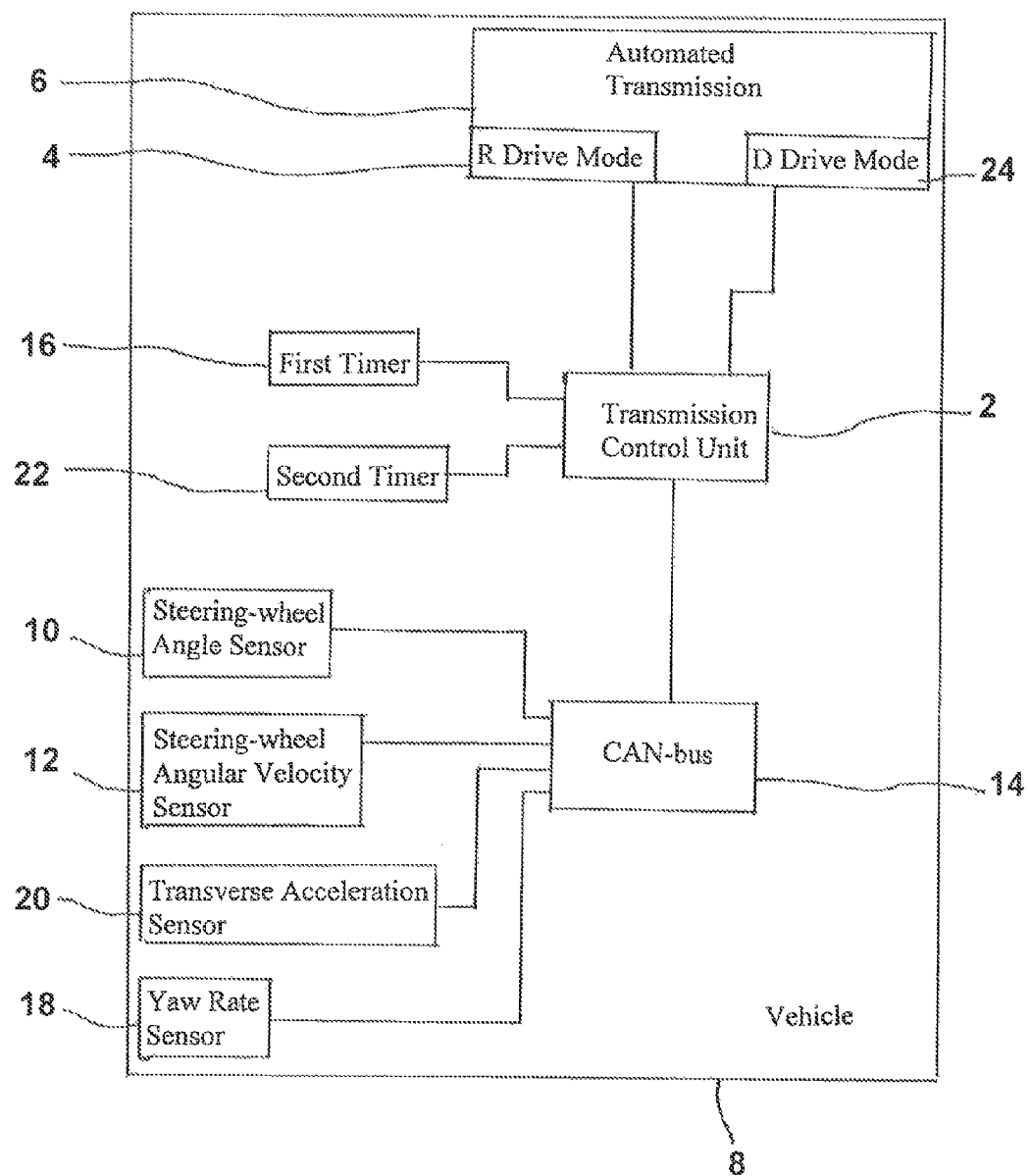
FIG. 2 is a diagrammatic view of an automated transmission of a vehicle in which an evasive manoeuver is recognized and enabled.

Referring to attached FIGS. 1 and 2, at the beginning of the process a transmission control unit 2 checks whether the R drive mode 4 is engaged, in the automated transmission 6 of the vehicle 8, whether the sensor values for the steering-wheel angle and the steering-wheel angular velocity are valid, and whether the steering-wheel angle and the steering-wheel angular velocity are in excess of predetermined threshold values. These values being sensed by a steering-wheel angle sensor 10 and a steering wheel angular velocity sensor 12 and transmitted by a CAN-bus 14.

If all these conditions are met a first timer 16, Timer 1, is started and in a next step it is checked whether, if the sensor values for the yaw rate and the transverse acceleration of the vehicle are valid, the yaw rate and transverse acceleration are in excess of a respective predetermined threshold value while the first timer is running. These values being sensed by a yaw rate sensor 18 and a transverse acceleration sensor 20 and transmitted by the CAN-bus 14.

If that is the case, a driver's wish to carry out an evasive manoeuver is recognized and a second timer 22, Timer 2, is started, and provided that the first and second timers have not yet run their course the speed threshold for permissible engagement of the drive mode D 24 is increased to a predefined threshold value which is higher than the normal threshold value for the permissible engagement of drive mode D 24.

Examples of threshold values for the yaw rate, the transverse acceleration, the steering-wheel angle and the steering-wheel angular velocity are, respectively, 50 degrees/s, 3 m/s², 300 degrees and 300 degrees/s, whereas the time window associated with the first timer can be 4000 ms and the time window associated with the second timer can be 2000 ms.

Furthermore, the increased speed threshold for permissible engagement of drive mode D can be 70 km/h; as a rule the normal speed threshold for permissible engagement of drive mode D is 7 km/h.

The invention claimed is:

1. A method of recognizing and enabling an evasive manoeuver of changing a direction of travel through 180 degrees while driving in a reverse drive mode in a vehicle with an automated transmission, the method comprising the steps of:

initiating the method, with a transmission control unit, while driving the vehicle in the reverse drive mode at a speed that is either greater than or equal to a normal speed threshold value, below which engagement of a forward drive mode is permissible, checking with the transmission control unit whether sensor values for a steering-wheel angle and a steering-wheel angular velocity are valid, and whether the steering-wheel angle and the steering-wheel angular velocity sensor values are in excess of predetermined threshold values, starting a first timer, with the transmission control unit, if the steering-wheel angle and the steering-wheel angular velocity sensor values are valid, and the steering-wheel angle and the steering-wheel angular velocity sensor values exceed the predetermined threshold values, and then checking with the transmission control unit whether sensor values for yaw rate and transverse acceleration of the vehicle are valid, and whether the sensor values for the yaw rate and the transverse acceleration of the vehicle are in excess of respective predetermined threshold values while the first timer is still running, and when (a) the sensor values for the yaw rate and the transverse acceleration of the vehicle are valid, (b) the sensor values for the yaw rate and the transverse acceleration of the vehicle are in excess of the respective predetermined threshold values, and (c) the first timer is still running, then detecting with the transmission control unit a driver's request to carry out the evasive manoeuver and starting a second timer with the transmission control unit, provided that the first and the second timers are still running, increasing with the transmission control unit the normal speed threshold value for permissible engagement of the forward (D) drive mode to a predefined speed threshold value which is higher than the normal threshold value for the permissible engagement of the forward (D) drive mode, and engaging the forward drive mode in the automated transmission at a higher speed than the normal speed threshold value.

2. The method of detecting and enabling the evasive manoeuver in the vehicle with the automated transmission according to claim 1, further comprising the step of:

transmitting the steering-wheel angle the steering-wheel angular velocity, the yaw rate and the transverse acceleration sensor values via a data bus and recognizing each of the steering-wheel angle, the steering-wheel angular velocity, the yaw rate and the transverse acceleration sensor values as valid if a status of a bus signal concerned is in order, and when the steering-wheel angle, the steering-wheel angular velocity, the yaw rate and the transverse acceleration sensor values are read directly the sensor value is recognized as valid if the sensor is operating normally and is delivering a plausible signal.

3. The method of detecting and enabling the evasive manoeuver in the vehicle with the automated transmission according to claim 1, further comprising the step of using, as the predetermined threshold values for the yaw rate and the transverse acceleration, the steering-wheel angle and the steering-wheel angular velocity, respectively, 50 degrees/s, 3 m/s², 300 degrees and 300 degrees/s, and using stooping running of the first timer, when the first timer has run for a first time span window of 4000 ms and stopping running of the second timer, when the second timer has run for a second time span window of 2000 ms.

4. A method of recognizing and enabling an evasive manoeuver of changing a direction of travel through 180 degrees while driving in a reverse drive mode in a vehicle with an automated transmission, the method comprising the steps of:

initiating the method with a transmission control unit while driving the vehicle in the reverse drive mode at a speed that is either equal to or faster than a speed threshold value of 7 km/h, below which engagement of a forward drive mode is permissible;

checking with the transmission control unit whether a sensor value for a steering-wheel angle and a sensor value for a steering-wheel angular velocity are valid;

checking with the transmission control unit whether the sensor value for the steering-wheel angle exceeds a predetermined steering-wheel angle threshold value and the sensor value for the steering-wheel angular velocity exceeds a predetermined steering-wheel angular velocity threshold value;

starting a first timer, with the transmission control unit, to run for a first duration of time, if the respective sensor values for the steering-wheel angle and the steering-wheel angular velocity are valid, the sensor value for the steering-wheel angle exceeds the predetermined steering-wheel angle threshold value, and the sensor value for the steering-wheel angular velocity exceeds the associated predetermined steering-wheel angular velocity threshold value;

checking with the transmission control unit whether a sensor value for vehicle yaw rate is valid and a sensor value for transverse acceleration of the vehicle is valid, and checking with the transmission control unit whether the sensor value for vehicle yaw rate exceeds a predetermined vehicle yaw rate threshold value and the sensor value for the transverse acceleration of the vehicle exceeds a predetermined transverse acceleration threshold value while the first timer is still running in the first duration of time;

detecting with the transmission control unit a driver's request to carry out the evasive manoeuver when the respective sensor values for the vehicle yaw rate and the transverse acceleration of the vehicle are valid and exceed the respective predetermined vehicle yaw rate and the transverse acceleration threshold values while the first timer is still running in the first duration of time;

starting a second timer, with the transmission control unit, to run for a second duration of time when the driver's request to carry out the evasive manoeuver is detected;

if the first and the second timers are still running, respectively, in the first and the second durations of time, increasing with the transmission control unit the speed threshold value of 7 km/h to a predefined speed threshold value which is higher than the speed threshold value of 7 km/h; and engaging the forward drive mode in the automated transmission at a higher speed than the speed threshold value of 7 km/h.

5. The method for detecting and enabling an evasive manoeuver in a vehicle with an automated transmission according to claim 4, further comprising the step of recognizing with the transmission control unit that the respective sensor values for the steering-wheel angle and the steering-wheel angular velocity and the respective sensor values for the vehicle yaw rate and the transverse acceleration of the vehicle are valid, when the sensor values are transmitted by a data bus, if the status of respective bus signals concerned are in order, and when the respective sensor values are read directly, the respective sensor values are recognized as valid if an associated sensor is operating normally and is delivering a plausible signal.

6. The method for detecting and enabling an evasive manoeuver in a vehicle with an automated transmission according to claim 4, further comprising the steps of:
- defining in the transmission control unit the predetermined threshold value for the vehicle yaw rate as 50 degrees/s;
- defining in the transmission control unit the predetermined threshold value for the transverse acceleration as 3 m/s$^2$;
- defining in the transmission control unit the predetermined threshold value for the steering-wheel angle as 300 degrees;
- defining in the transmission control unit the predetermined threshold value for the steering-wheel angular velocity as 300 degrees/s; and
- defining in the transmission control unit the first duration of time for running the first timer as 4000 ms and the second duration of time for running the second timer as 2000 ms.

\* \* \* \* \*